US012801140B2

(12) United States Patent
Paul et al.

(10) Patent No.: US 12,801,140 B2
(45) Date of Patent: Nov. 17, 2026

(54) MOBILE ROBOT LOCALIZATION SYSTEMS

(71) Applicant: Omron Corporation, Kyoto (JP)

(72) Inventors: George Vikram Paul, Amherst, NH (US); Kathleen Cunningham, Amherst, NH (US)

(73) Assignee: OMRON Corporation, Kyoto (JP)

( * ) Notice: Subject to any disclaimer, the term of this patent is extended or adjusted under 35 U.S.C. 154(b) by 260 days.

(21) Appl. No.: 18/481,962

(22) Filed: Oct. 5, 2023

(65) Prior Publication Data

US 2024/0126267 A1 Apr. 18, 2024

Related U.S. Application Data

(60) Provisional application No. 63/379,635, filed on Oct. 14, 2022.

(51) Int. Cl.
*G05D 1/02* (2020.01)
*G05D 1/00* (2006.01)

(52) U.S. Cl.
CPC .................................... *G05D 1/024* (2013.01)

(58) Field of Classification Search
CPC ............... G05D 1/024; G05D 2105/28; G05D 2109/10; G05D 1/2464; G05D 1/2424; G01C 21/005; G01C 21/1652; G01C 21/206; G01C 21/28; G01C 21/3461; G01S 7/4813; G01S 7/4817; G01S 17/87; G01S 17/89; G01S 17/931
See application file for complete search history.

(56) References Cited

U.S. PATENT DOCUMENTS

| | | | | |
|---|---|---|---|---|
| 8,395,663 | B2 | 3/2013 | Hsieh et al. | |
| 8,744,665 | B2 | 6/2014 | Shin et al. | |
| 10,240,930 | B2 * | 3/2019 | Zhou | G05D 1/101 |
| 11,232,583 | B2 | 1/2022 | Narasimha | |
| 11,423,570 | B2 | 8/2022 | Kavulya et al. | |

(Continued)

FOREIGN PATENT DOCUMENTS

| | | | |
|---|---|---|---|
| CN | 210819622 | U | 6/2020 |
| CN | 111694009 | A | 9/2020 |

(Continued)

OTHER PUBLICATIONS

PCT Search Report and Written Opinion dated Mar. 11, 2024 for PCT/US2023/076124 (21 pages).
Office Action received in Japanese Patent Application No. 2025-519630, mailed Feb. 10, 2026, 13 pages (including 6 pages of machine translation).

*Primary Examiner* — Anne Marie Antonucci
*Assistant Examiner* — Connor L Knight
(74) *Attorney, Agent, or Firm* — Knobbe, Martens, Olson & Bear, LLP

(57) ABSTRACT

A mobile robot can include a first laser scanner and a second laser scanner. The robot position can be compared to a designated area to determine whether the robot is inside the designated area. One of the first laser scanner or the second laser scanner can be selected to use for localization based at least on whether the robot is inside the designated area. A laser scan can be performed using the selected one of the first laser scanner or the second laser scanner to provide laser scan information. The laser scan information can be compared to a mapping of an area around the robot to determine a location of the robot.

20 Claims, 5 Drawing Sheets

(56) References Cited

U.S. PATENT DOCUMENTS

| | | | | |
|---|---|---|---|---|
| 2005/0182518 | A1* | 8/2005 | Karlsson ................ | G06V 10/84<br>700/253 |
| 2009/0164044 | A1 | 6/2009 | Han et al. | |
| 2011/0097014 | A1 | 4/2011 | Lin | |
| 2016/0378111 | A1 | 12/2016 | Lenser et al. | |
| 2017/0219713 | A1* | 8/2017 | Gruver .................... | G01S 17/89 |
| 2018/0232947 | A1* | 8/2018 | Nehmadi ................ | G01S 7/295 |
| 2018/0253107 | A1* | 9/2018 | Heinla .................... | G06T 7/579 |
| 2018/0307241 | A1* | 10/2018 | Holz .................... | G05D 1/0244 |
| 2019/0323845 | A1 | 10/2019 | Agarwal et al. | |
| 2020/0019169 | A1* | 1/2020 | Suvarna ............... | G05D 1/0248 |
| 2020/0339151 | A1* | 10/2020 | Batts ................... | B60W 50/029 |
| 2020/0376676 | A1 | 12/2020 | Eoh et al. | |

FOREIGN PATENT DOCUMENTS

| | | | | |
|---|---|---|---|---|
| CN | 112344935 | A | 2/2021 | |
| CN | 112987745 | A | 6/2021 | |
| CN | 111962442 | B | 12/2021 | |
| CN | 111258313 | B | 6/2022 | |
| CN | 113357503 | B | 8/2022 | |
| EP | 3063585 | B1 * | 1/2022 | ........... G01S 7/4817 |
| JP | 2016-206999 | A | 12/2016 | |
| JP | 2021-018638 | A | 2/2021 | |
| JP | 2021-096703 | A | 6/2021 | |
| JP | 2022-110773 | A | 7/2022 | |
| KR | 102206512 | B1 | 1/2021 | |
| WO | WO 2013/119942 | A1 | 8/2013 | |

* cited by examiner

MOBILE ROBOT LOCALIZATION SYSTEMS

CROSS-REFERENCE TO RELATED APPLICATIONS

This application claims the benefit under 35 U.S.C. § 119(e) of U.S. Provisional Patent Application No. 63/379,635, filed Oct. 14, 2022, and titled "MOBILE ROBOT LOCALIZATION SYSTEMS". The entirety contents of each of the above-identified application(s) are hereby incorporated by reference herein and made part of this specification for all that they disclose.

BACKGROUND

Field of the Disclosure

Some embodiments disclosed herein relate to localization systems for mobile robots.

Description of the Related Art

Although various localization systems are known for enabling mobile robots to identify their locations in an environment, there remains a need for improved mobile robot localization systems.

SUMMARY

Certain example aspects of the present disclosure are summarized below for illustrative purposes. The disclosure is not limited to the specific implementations recited herein. Aspects of the disclosure may include several novel features, no single one of which is solely responsible for its desirable attributes.

Various aspects of the disclosure can relate to a mobile robot, which can include a drive system configured to move the mobile robot, a first laser scanner, a second laser scanner, a hardware processor, and computer readable memory that includes a map of the environment, a designated area in the map of the environment, a robot location, and a direction associated with the designated area. The computer readable memory can have instructions that are executable by the processor to cause the robot to compare the robot location to the designated area to determine whether the robot is inside or outside the designated area. When the robot location is outside the designated area, the robot can perform a first laser scan using the first laser scanner to provide first laser scan information, perform a second laser scan using the second laser scanner to provide second laser scan information, and compare the first laser scan information and the second laser scan information to the map of the environment to determine a new robot location. When the robot location is inside the designated area, the robot can compare an orientation of the robot to the direction associated with the designated area to determine an angle between the orientation of the robot and the direction associated with the designated area, identify one of the first laser scanner or the second laser scanner based at least in part on the determined angle, perform a laser scan using the one of the first laser scanner or the second laser scanner to provide laser scan information, and compare the laser scan information to the map of the environment to determine a new robot location.

The first laser scanner and the second laser scanner can together provide a laser scanning range that extends 360 degrees around the robot. The first laser scanner can have a laser scan range of at least about 180 degrees, and the second laser scanner can have a laser scan range of at least about 180 degrees. A laser scan range of the first laser scanner can overlap a laser scan range of the second laser scanner.

Various aspects of the disclosure can relate to a mobile robot, which can include a drive system configured to move the mobile robot, a first laser scanner, a second laser scanner, and a localization system configured to operate in a first mode that uses both the first laser scanner and the second laser scanner to determine a location of the robot. The localization system can be configured to operate in a second mode that uses only one of the first laser scanner and the second laser scanner to determine the location of the robot.

The localization system is configured to determine whether to operate in the first mode or the second mode based at least in part on a position of the robot. The localization system can be configured to compare a position of the robot to a designated area to determine whether the robot is inside of the designated area. The localization system can be configured to operate in the first mode when the robot is outside the designated area, and to operate in the second mode when the robot is inside the designated area. The localization system can be configured to compare an orientation of the robot to a direction associated with the designated area, and to select one of the first laser scanner or the second laser scanner to use for localization based at least in part on the comparison of the orientation of the robot to the direction associated with the designated area. The localization system can be configured to determine an angle between an orientation of the robot and a direction associated with the designated area. The localization system can use the first laser scanner for localization when the angle is in a first angle range, and the localization system can use the second laser scanner for localization when the angle is in a second angle range. The localization system can be configured to select one of the first laser scanner or the second laser scanner to use for localization based at least in part on the orientation of the robot. The localization system can be configured to perform the first mode of operation by performing a first laser scan using the first laser scanner to provide first laser scan information, performing a second laser scan using the second laser scanner to provide second laser scan information, and comparing the first laser scan information and the second laser scan information to a map of the environment to determine an updated robot location. The first laser scanner and the second laser scanner can together provide a laser scanning range that extends 360 degrees around the robot. The first laser scanner can have a laser scan range of at least about 180 degrees, and wherein the second laser scanner can have a laser scan range of at least about 180 degrees. A laser scan range of the first laser scanner can overlap a laser scan range of the second laser scanner.

Various aspects of the disclosure can relate to a method for determining a location of a mobile robot that includes a first laser scanner and a second laser scanner. The method can include comparing a robot position to a designated area to determine that the robot is inside the designated area. In response to the determination that the robot is inside the designated area, the method can include selecting one of the first laser scanner or the second laser scanner to use for localization. The method can include performing a laser scan using the selected one of the first laser scanner or the second laser scanner to provide laser scan information. The method can include comparing the laser scan information to a mapping of an area around the robot to determine a location of the robot.

The first laser scanner and the second laser scanner can together provide a laser scanning range that extends 360 degrees around the robot. The first laser scanner can have a laser scan range of at least about 180 degrees, and the second laser scanner can have a laser scan range of at least about 180 degrees. The method can include comparing an orientation of the robot to a direction associated with the designated area, and selecting the one of the first laser scanner or the second laser scanner to use for localization based at least in part on the comparison of the orientation of the robot to the direction associated with the designated area. The method can include determining an angle between an orientation of the robot and a direction associated with the designated area, and selecting the first laser scanner for use in localization based at least in part on the determined angle. The method can include selecting the one of the first laser scanner or the second laser scanner to use for localization based at least in part on the orientation of the robot.

Various aspects of the disclosure can relate to a method that can include accessing a map of an environment, designate a first area in the map of the environment for a first type of robot localization, designate a second area in the map of the environment for a second type of robot localization.

The first type of robot localization can use a multiple-laser-scanner localization operation. The second type of robot localization can use a single-laser-scanner localization operation. The one of the first or second types of robot localization can use GPS localization. The one of the first or second types of robot localization can use overhead light localization.

Various aspects of the disclosure can relate to a method, which can include accessing a map of an environment. The method can include determining whether a robot is in a first area in the map of the environment and performing a first type of robot localization when the robot is in the first area. The method can include determining whether a robot is in a second area in the map of the environment and performing a second type of robot localization when the robot is in the second area. The first type of robot localization can use a multiple-laser-scanner localization operation. The second type of robot localization can use a single-laser-scanner localization operation. The one of the first or second types of robot localization can use GPS localization. The one of the first or second types of robot localization can use overhead light localization.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF CERTAIN EMBODIMENTS

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Mobile Robots

Figure 1:
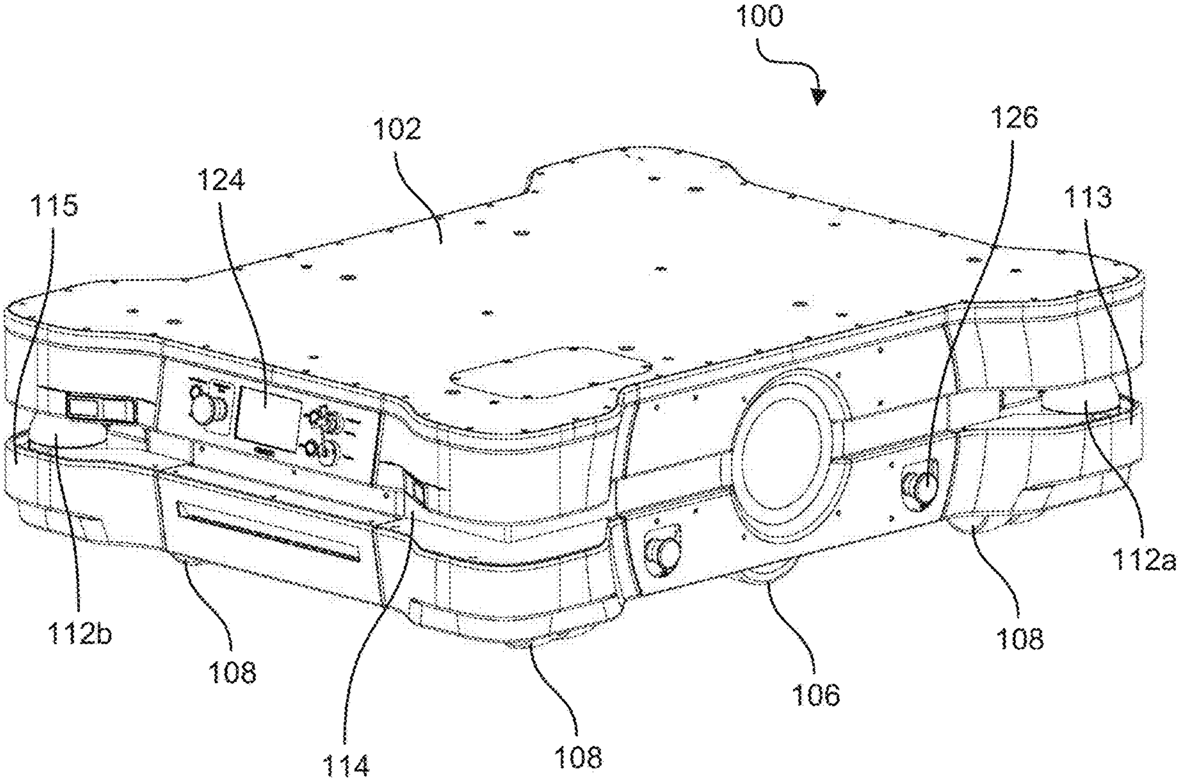
FIG. 1 shows an example embodiment of a mobile robot.
Figure 2:
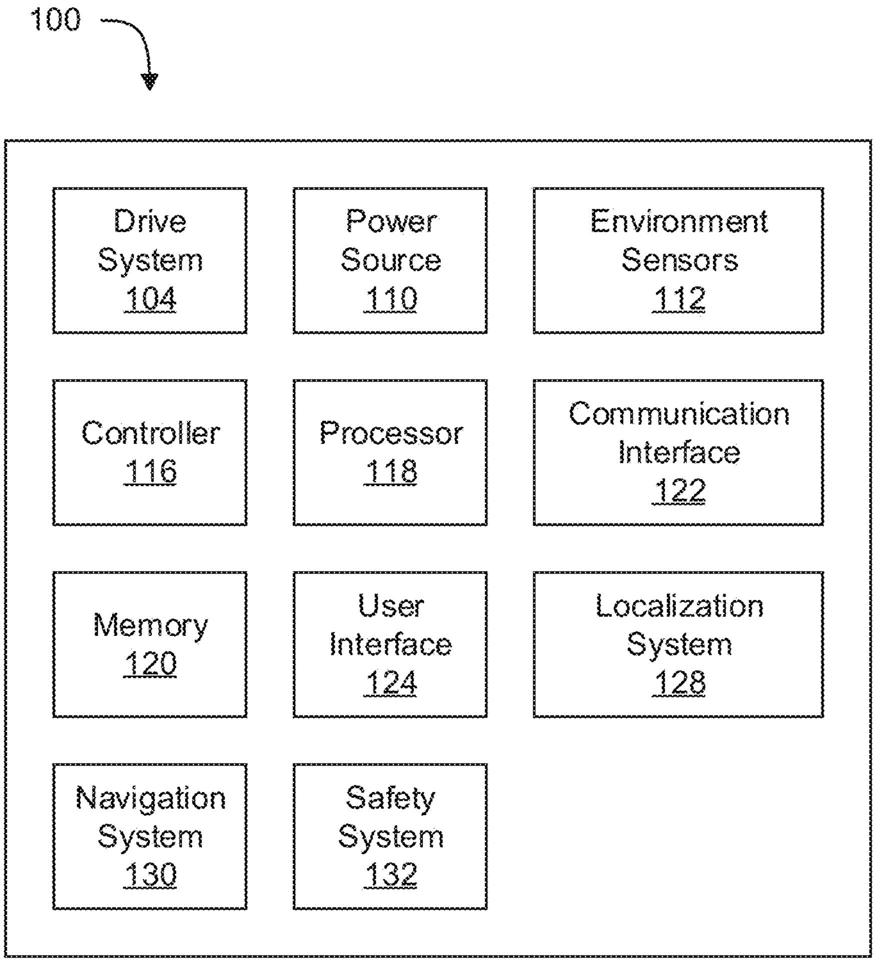
FIG. 2 is a schematic diagram of an example embodiments of a mobile robot.

FIG. 1 shows an example embodiment of a mobile robot 100. FIG. 2 shows a schematic diagram of a mobile robot 100. The mobile robot 100 can have a chassis or housing 102, which can support various other components of the robot 100. Some components can be disposed inside the housing 102, and some components can be at least partially exposed so that they can interact with entities outside the housing 102. The robot 100 can have a drive system 104, which can be configured to move the robot 100. For example, the robot 100 can have one or more driven wheels 106, which can be driven by at least one motor (not visible in FIG. 1). In some embodiments, two or more driven wheels 106 can be independently driven to cause the mobile robot 100 to move forward, move backward, turn, etc. In some embodiments, a steering mechanism (e.g., a pivoting wheel) can turn the robot 100. In some cases, one or more non-driven wheels 108 (e.g., caster wheels) can provide support to the robot 100. In some embodiments, the drive system 104 can include a braking system (e.g., not visible in FIG. 1), which can be configured to stop the robot 100. Various other suitable drive systems can be used, such as tracks or legs.

The robot 100 can include a power source 110, which can be a battery. The battery can be rechargeable, and the robot 100 can be configured to dock with a recharging station for regarding the battery (e.g., through an electrical interface). The power source 110 can provide electrical power to operate the drive system 104 (e.g., one or more electric motors), the various sensors, processors, controllers, and other systems disclosed herein. The power source 110 can provide DC or AC power, and any suitable type of power source 110 could be used.

The robot 100 can have one or more environmental sensors 112, which can be used to sense or measure the environment around the robot 100. The environmental sensor 112 can be a Lidar system, for example. The environmental sensor 112 can include at least one laser, which can emit laser pulses across a range of angles. The environmental sensor 112 include a light detector, which can receive light from the laser pulses that was reflected by the environment (e.g., objects) around the robot 100. The received light can be used to determine the location of objects around the robot 100. For example, the direction of the emitted laser pulse and/or the direction of the received light can indicate the direction of the object, and the timing of the emitted laser pulse and/or the received light (e.g., time-of-flight) can indicate the distance of the object from the robot. The housing 102 of the robot 100 can have an opening 114, such as a generally horizontal slit, to permit light to exit and enter the environmental sensor 112 of the robot 100 (e.g., across a range of angles). Although various embodiments are discussed herein in connection with examples that use laser scanners, various other types of environmental sensors 112 could be used, such a camera, a video analysis system that analyzes video from a camera on the robot 100 to identify objects or other environmental features, a sonar system, a heat sensor, and/or a GPS sensor, etc.

The system can include a controller 116, which can operate various aspect of the robot 100. For example, the controller 116 can interpret information from the environmental sensor 112, such as to perform localization (e.g., to estimate where the robot is located in a map of the environment), identify objects, determine distances to or locations of objects, operate the drive system 104, perform navigation and/or collision avoidance operations, perform safety stops or emergency braking, or various other features and functions of the robot 100. The various functions of the robot 100 disclosed herein can be implemented by the controller 116, even where the controller 116 is not specifically discussed.

The robot 100 can include at least one processor 118, which can be a hardware processor. The processor 118 can include circuitry configured to execute operations to implement the various functions and features discussed herein. In some embodiments, the robot 100 can include multiple processors 118, and different tasks can be performed by different processors 118. The robot 100 can include memory 120, which can be computer-readable memory (e.g., non-transitory computer-readable memory). The memory 120 can include RAM, ROM, non-volatile memory, flash memory, a hard disc, or any other suitable type of memory. In some embodiments, the robot 100 can include multiple memory components, which can store different types of information or instructions for different function or features. The memory 120 can include instructions that can be executed by the at least one processor 118 to implement the controller 116 and/or to perform the various functions and features disclosed herein. In some embodiments, the functions and/or features can be implemented by an integrated circuit or other special purpose processor that is specifically configured to perform the functions and features disclosed herein.

The robot 100 can include a communication interface 122, which can be used to send information from the robot 100 and/or to receive information from an external device. The communication interface 122 can be wireless, such as using WiFi, Bluetooth, or any other suitable wireless communication protocol. In some embodiments, the communication interface 122 can use a wired connection. For example, the communication interface 122 can include a port or a plug, which can be configured to connect to a corresponding plug or port that is coupled to an external device, to enable communication therebetween. For example, a USB port can be used, although various types of ports or other wired connections could be used. In some cases, a user can couple a laptop, smartphone, or other computer device to the robot 100 via the communication interface for adjusting parameter(s) of the robot 100, for diagnosing issues with the robot 100, for updating features of the robot 100, etc.

The robot 100 can include a user interface 124, which can be used to receive input from a user and/or to provide output (e.g., information) to a user. The user interface 124 can include one or more buttons 126, switches, dials, or other user input elements, a touchscreen, a display, one or more lights, a speaker, a microphone, etc. In some cases, a user can provide input to adjust parameter(s) of the robot 100.

The robot 100 can include a localization system 128, which the robot 100 can use to determine its location in the environment. The robot 100 can have a map of the expected environment (e.g., stored in the memory 120). The localization system can use the environment sensor(s) 112 to measure features of the environment around the robot 100. The localization system 128 can compare the measured features of the environment to the map of the expected environment to determine the location of the robot 100 in the environment. For example, the localization system 128 can analyze how well the measured environment information matches the expected environment information for multiple robot locations. The localization system 128 can identify the robot location for which the measured environment information better or best matches the expected environment information. The localization system 128 can determine the position and/or orientation (e.g., azimuthal angle) of the robot 100, such as by comparing the information from the environment sensor(s) 112 to the map information.

The robot 100 can include a navigation system 130. The navigation system 130 can receive a destination and/or one or more waypoints, such as from the user interface 124 or the communication interface 122, or determined by the controller 116. The navigation system 130 can use the current location of the robot 100, which can be determined by the localization system 128, and can determine a path from the current location to the destination or waypoint. The navigation system 130 can receive environmental information (e.g., object locations) from the environmental sensor 112, and can use that information to determine a path to the destination or waypoint. The navigation system 130 can determine trajectory information to navigate the robot 100 (e.g., towards a destination). The trajectory information can include a path or route. The trajectory information can include one or more speeds or velocities for the robot (e.g., at one or more portions or locations along the path or route). In some cases, the navigation system 130 can determine intermediate waypoints based on the environmental information. In some embodiments, the navigation system 130 can modify the trajectory information while the robot 100 is moving. For example, if an object moves or a new, unmapped object is detected (e.g., by the environment sensor 112), the navigation system 130 can determine to change the path or route of the robot 100 and/or can determine to change a speed of the robot 100, for example that will avoid collision with the detected object.

The robot 100 can include a safety system 132, which can determine when a safety event has occurred and can perform an emergency stop in response to a safety event. The safety system 132 can determine if an object is inside of the robot's active safety zone. The safety zone can form a perimeter around the robot 100. The safety zone can extend in front of the robot 100 along the robot's direction of travel (e.g., having a generally fanned or trapezoidal shape that can widen along a direction extending away from the robot 100). The safety zone can be larger when the robot 100 is moving at a faster speed, and the safety zone can be smaller when the robot 100 is moving at a slower speed. The safety system 132 can determine whether any objects are inside of the current safety zone. If an object is identified inside of the safety zone, the safety system 132 can implement a safety procedure, such as to stop the robot 100. The safety system 132 can determine the location of object(s) using the environment sensor 112 (e.g., the laser scanner 112*a* and/or laser scanner 112*b*).

The example embodiment of FIG. 1 includes a first laser scanner 112*a*, which can be positioned at a first location on the robot 100, such as at the front-right corner. The robot 100 can include a second laser scanner 112*b*, which can be positioned at a second location, which can be generally opposite the first location, such as the rear-left corner. The first laser scanner 112*a* can have scanning range that extends generally across the front of the robot 100 and across a first side (e.g., right side) of the robot 100. The second laser scanner 112*b* can have scanning range that extends generally across the back of the robot 100 and across a second side (e.g., left side) of the robot 100. The first laser scanner 112*a* and/or the second laser scanner 112*b* can each have a scanning range of about 180 degrees, about 195 degrees, about 210 degrees, about 225 degrees, about 240 degrees, about 255 degrees, about 260 degrees, about 265 degrees, about 270 degrees, about 275 degrees, about 280 degrees, about 285 degrees, or more, or any values or ranges between any of these values, although other designs could also be used. The two laser scanners 112*a* and 112*b* can have a combined range that extends a full 360 degrees around the robot 100. The scanning range of the first laser scanner 112*a* can overlap with the scanning range of the second laser scanner 112*b*. The housing 102 can have a protrusion 113 at the first corner that has the first laser scanner 112*a* to enable the first laser scanner 112*a* to scan a larger range without hitting the housing 102 of the robot 100. The housing 102 can have a protrusion 115 at the second corner that has the second laser scanner 112*b* to enable the second laser scanner 112*b* to scan a larger range without hitting the housing 102 of the robot 100. The opening 114 can be a channel or slot, which can also enable the first laser scanner 112*a* and/or the second laser scanner 112*b* to have a larger scanning range without hitting the robot 100. In some embodiments, the opening 114 (e.g., channel or slot) can extend around the full perimeter of the robot 100.

Dynamic Localization

The localization system 128 of the robot 100 can use information from both laser scanners 112*a* and 112*b* to determine the location of the robot 100 in a first mode of operation. The localization system 128 can use information from only one of the laser scanners 112*a* or 112*b* to determine the location of the robot 100 in a second mode of operation. In some embodiments, the robot 100 can use the first mode of operation by default. In many situations a scan of the full 360 degree area around the robot 100 can be beneficial to give the localization system 128 as much information as possible for determining the location of the robot 100. However, as discussed herein, in some situations an area of the environment may be unreliable for the purpose of performing localization. For example, the unreliable area may be an unmapped area of the environment, a loading area where boxes or other items are frequently being rearranged, a high traffic area where other robots or people are frequently present, or some other dynamic area for which the actual scan of the area often does not match well with the mapping of the area. Using the laser scan information of the unreliable area can impede the localization process and in some cases can cause the robot 100 to become lost so that it does not know its own location in the environment or on a map.

In some embodiments, the robot 100 can use the second mode of operation so that the localization system 128 only uses information from only one of the laser scanners 112*a* and 112*b* to perform the localization. The laser scanner 112*a* or 112*b* that is not directed toward the unreliable area can be used, and information from the other laser scanner 112*b* or 112*a* that is directed towards the unreliable area can be omitted. In some cases, both laser scanners 112*a* and 112*b* can continue to operate, such as for collision avoidance, safety checks, or navigation, but the localization system 128 can determine the robot's location without using the information from the laser scanners 112*a* or 112*b* that scans the unreliable area. This can enable the robot 100 to avoid becoming confused or lost when the scan of the unreliable area does not match the mapping of the reliable area.

Figure 3:
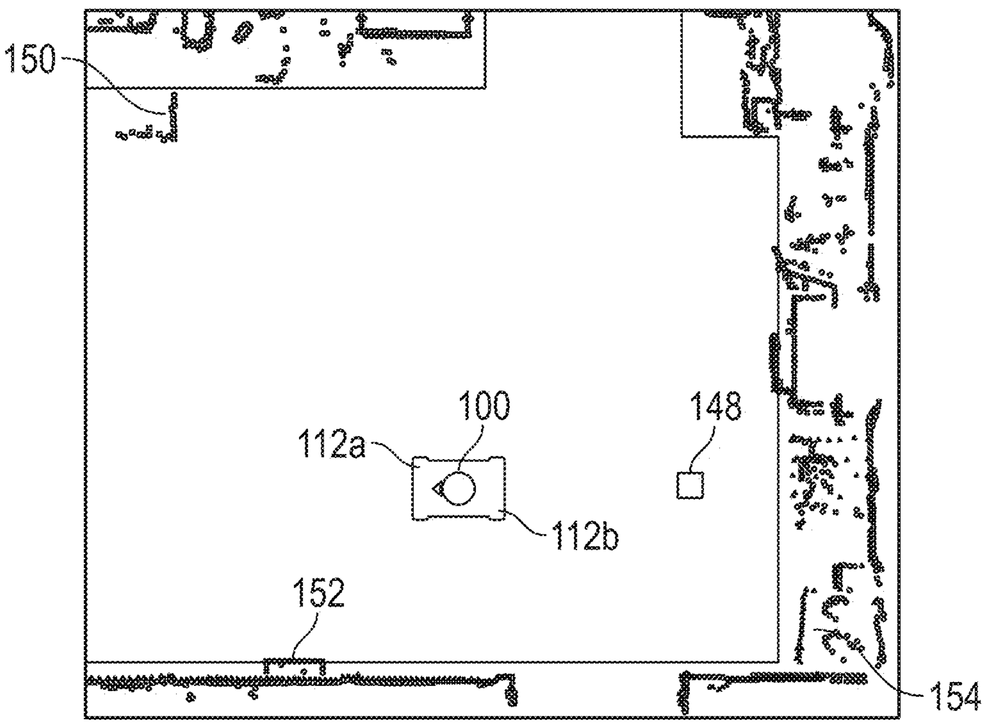
FIG. 3 shows a plan view of a robot in a first orientation and performing a scan of the environment using two laser scanners.
Figure 4:
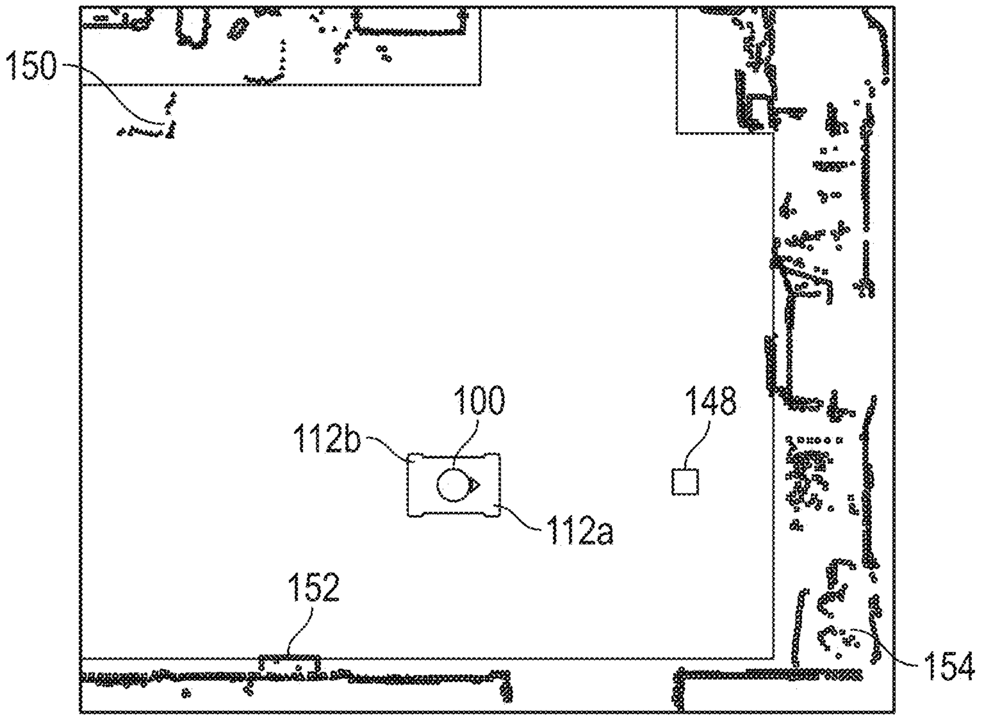
FIG. 4 shows a plan view of a robot in a second orientation and performing a scan of the environment using two laser scanners.

FIGS. 3 and 4 show examples of a robot 100 scanning an environment. A map of the environment is shown in Circle shapes. The robot 100 can have the map of the environment stored in its memory 120. Various types of maps could be used. For example, the map can be generated using a Lidar system or other laser scanner, and the map can include information regarding various positions where structure was detected during a mapping or scan of the environment. In some cases, the map can be generated by the robot 100 itself, such as during a prior mapping operation, or a separate scanning or mapping device or system can be used. In some cases, the map can include an architectural layout of the environment, such as showing walls, pillars, fixtures, etc., or information relating to the locations of those features. The map can reflect how the environment existed at the time the map was created. In some cases, the actual layout of the environment can differ from the information of the map. For example, an object may have been moved after the map was created, or additional structure may have been added to the area, or another robot or a person may be moving through the area. In some cases, the map can be of an area that is larger than what is shown in FIGS. 3 and 4, which can be an excerpt of the map. FIGS. 3 and 4 also show a target location 148 (e.g., destination of waypoint), which can have a location on the map. In some cases, the robot 100 can know its location relative to the target location 148 because the robot 100 knows its position on the map.

FIGS. 3 and 4 show first dots or points, having square shapes, for locations where the first laser scanner 112*a* identified structure (e.g., where light from the first laser scanner 112*a* was reflected back to the first laser scanner 112*a*). FIGS. 3 and 4 show second dots or points, having triangle shapes, for locations where the second laser scanner 112*b* identified structure (e.g., where light from the second laser scanner 112*b* was reflected back to the second laser scanner 112*b*). In FIG. 3, the robot 100 is facing to the left, with the first laser scanner 112*a* scanning the area to the left and top of FIG. 3, and the second laser scanner 112*b* scanning the area to the right and bottom of FIG. 3. In FIG. 4, the robot 100 is facing to the right, with the first laser scanner 112*a* scanning the area to the right and bottom of FIG. 4, and the second laser scanner 112*b* scanning the area to the top and left of FIG. 4. In both FIG. 3 and FIG. 4, the scan areas of the first and second laser scanners 112*a*, 112*b* can overlap at the upper right area and the lower left area. In FIG. 3, the lower right area is scanned only by the second laser scanner 112*b*, and the upper left area is scanned only the first laser scanner 112*a*. In FIG. 4, the lower right area is scanned only by the first laser scanner 112*a*, and the upper left area is scanned only the second laser scanner 112*b*.

Many of the first dots and the second dots align with structures of the mapping of the environment, which can indicate that those particular structures did not change from when the environment was mapped. However, in some instances, some of the first dots and/or second dots are located between the robot 100 and the mapped structure. This can indicate that some new structure was added, or moved, after the environment was mapped. For example, the area 150 does not include any mapped structure, but the laser scanning performed by the robot identified structure at the area 150. This could be because a box or other item was placed at area 150 after the environment was mapped. In some cases, the first dots and/or second dots can be located behind the mapped structure (e.g., with the mapped structure between the dots and the robot 100). This can indicate that some structure that had been mapped was removed. For example, area 152 has mapped structure, but the first dots and the second dots are disposed a different structure behind area 152. This could be because a box or other item was present at location 152 during the mapping of the environment but was later removed.

In FIGS. 3 and 4, the robot 100 is shown at its location in the environment. In some situations, the robot 100 may not know its location in the environment, and the robot can perform an initial localization operation to determine its location. In some cases, a user can specify an initial location through the user interface 122. When the robot moves, it can repeatedly or periodically perform localization operations to update the location of the robot (e.g., relative to the map of the environment). The robot 100 can perform a laser scan of the environment (e.g., using one or both of the laser scanners 112*a*, 112*b*). With the laser scan information, the robot 100 would know the locations of the first and second dots with relation to the robot 100, but the robot 100 would not yet know the location of the mapped structure (e.g., or the target location 148). The localization system 128 can compare the laser scan information with the map location to identify a location on the map where the laser scan information is sufficiently matched with the map information, and the localization system 128 can determine that the robot 100 is located at that location (e.g., position and/or orientation). In some cases, the laser scan information does not completely match the map information, even when analyzed at the robot's actual location, such as would be the case if objects were moved or added after the mapping of the environment, as discussed herein. The more closely the laser scan information matches the mapping information, the more confident the localization system 128 can be in the determined robot location. For example, in FIGS. 3 and 4, the laser scan information for some areas (e.g., areas 150, 152, and 154) do not match the map information, but there is enough matching between the scanned locations and the structure locations on the map that the localization system 128 is able to accurately and/or confidently determine the location of the robot 100 on the map (e.g., relative to the structure of the environment).

If the actual structure of the environment being scanned by the robot were different enough from the mapped environment, the localization system 128 may not be able to accurately and/or confidently determine the location of the robot 100 on the map. This can result in the robot 100 becoming lost. In some cases, the robot 100 would not be able to navigate to the target location 148 because the robot 100 would not know its location relative to the target location 148.

Some areas can be more dynamic, or likely to change, than others. For example, a loading or staging area can frequently change as items are loaded and unloaded. Accordingly, a laser scan of that loading or staging area would not be helpful to the localization system 128, and would likely decrease the confidence in the determined location, or even cause the robot 100 to become lost. Other dynamic areas can include high traffic areas, regions with moving equipment, or the like. In some cases, an area may not even be mapped. In some cases, as the robot 100 gets closer to the dynamic or unreliable area, the detrimental effect on the localization process can increase, for example because the dynamic or unreliable area can occupy a larger portion of the laser scanning range. By way of example, the area in the lower right portion of FIGS. 3 and 4 (e.g., including location 154) can be a dynamic area (e.g., a loading area). As shown in FIGS. 3 and 4, the laser scan hit locations shown by the first dots in FIG. 4 and the second dots in FIG. 3 do not match well with the mapped structure around the location 154.

In some embodiments, the robot 100 can use the first localization mode, which uses both laser scanners 112*a* and 112*b*, as a default, and the robot 100 can change to the second localization mode, which uses only one of the laser scanners 112*a* or 112*b*, such as when a localization attempt with both laser scanners fails, or when the robot 100 is close to an area that is dynamic or otherwise unreliable for localization. The laser scanner 112*a* or 112*b* that is facing towards the dynamic or otherwise unreliable area can be omitted from the localization process. In some embodiments, areas of the map can be designated for the second localization mode (e.g., single laser scanner localization mode). The map data, or other data, can include coordinates, boundaries, or other information that identifies one or more areas in a manner so that the robot 100 can determine whether it is inside of one of the one or more areas. The designated area information can be stored on the memory 120 of the robot (e.g., as part of the map information or as separate information). The designated area can be sector 160 of the map.

Figure 5:
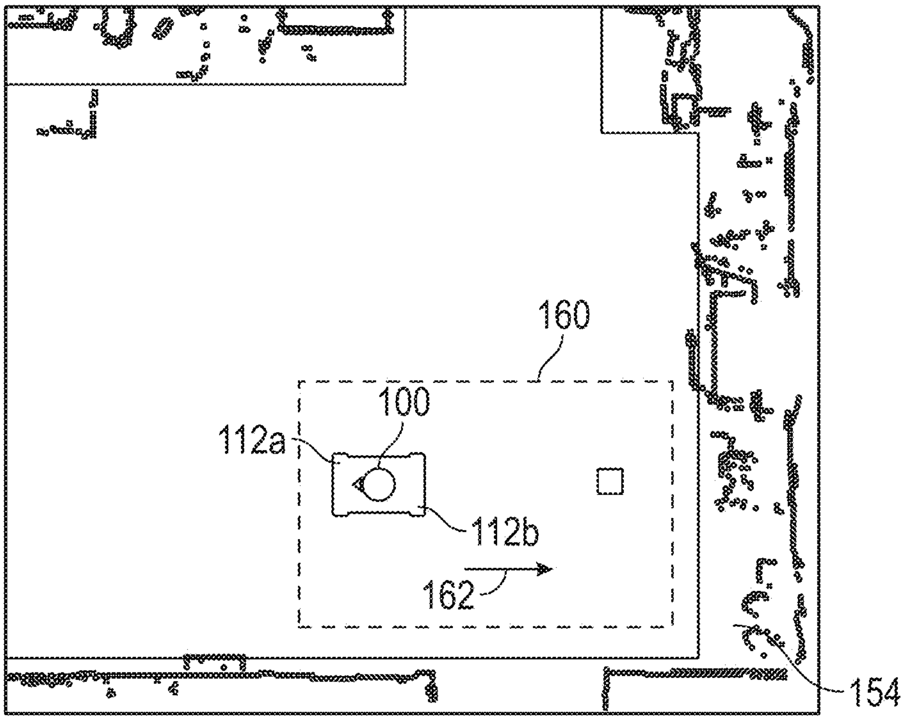
FIG. 5 shows a plan view of a robot in a first orientation and performing a scan of the environment using only the front laser scanner.
Figure 6:
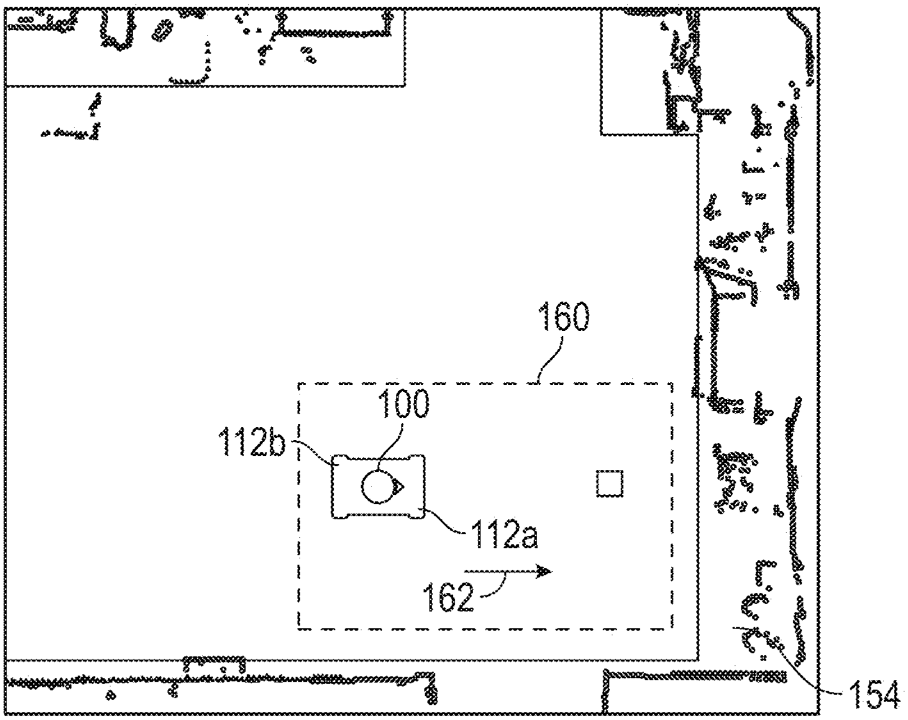
FIG. 6 shows a plan view of a robot in a second orientation and performing a scan of the environment using only the rear laser scanner.

FIGS. 5 and 6 show examples that have an area 160 that is designated for single laser scanner localization. When the robot 100 is inside the area 160, the robot 100 can use only one of the first and second laser scanners 112*a*, 112*b* for localization, and can omit information from the other of the first and second laser scanners 112*a*, 112*b*. The area 160 can be a rectangle, or it could be some other polygon shape, or any other suitable shape.

A direction 162 or angle can be associated with the area 160. The direction 162 can be used by the robot to determine which laser scanner 112*a* or 112*b* to use for the single laser scanner localization operation. The robot can determine an angle between the direction 162 and the direction that the robot 100 is facing. For a first angle range, the robot 100 can use the first laser scanner 112*a*, while omitting information from the second laser scanner 112*b*, for localization. For a second angle range, the robot 100 can use the second laser scanner 112*b*, while omitting information from the first laser scanner 112*a*, for localization. The first angle range can be substantially 180 degrees, and the second angle range can be substantially 180 degrees. In some embodiments, the first and second angle ranges do not overlap. The first angle range can center on about 180 degrees (e.g., meaning that the robot 100 is facing the opposite direction as the direction 162 associated with the area 160 as shown for example in FIG. 5), and can extend from about 90 degrees to about 270 degrees. The second angle range can center on about 0 degrees (e.g., meaning that the robot 100 is facing the same direction as the direction 162 associated with the area 160 as shown for example in FIG. 6), and can extend from about 270 degrees to about 90 degrees. Various other angle ranges could be used. For example, since the first laser scanner 112*a* scans to the front and right, the first angle range could be centered on about 135 degrees, and can extend from about 45 degrees to about 225 degrees. Since the second laser scanner 112*b* scans to the rear and left, the second angle range can be centered on about 315 degrees, and can extend from about 225 degrees to about 45 degrees. Various other suitable angle ranges could be used.

In the example of FIG. 5, the direction that the robot 100 is facing is substantially opposite of the direction 162 associated with the area 160. The angle between the directions is about 180 degrees, which is within the first angle range, which can result in the robot 100 using only the first laser scanner 112*a* to perform the localization operation. Accordingly, FIG. 5 includes only the first dots (e.g., shown with square shapes in FIG. 5). In FIG. 5, the area 154 was not scanned by the robot 100 in connection with the localization.

In the example of FIG. 6, the direction that the robot 100 is facing is substantially the same as the direction 162 associated with the area 160. The angle between the directions is about 0 degrees, which is within the second angle range, which can result in the robot 100 using only the second laser scanner 112*b* to perform the localization operation. Accordingly, FIG. 6 includes only the second dots (e.g., shown with triangle shapes in FIG. 6). In FIG. 6, the area 154 was not scanned by the robot 100 in connection with the localization.

The direction 162 can point in the direction that the robot 100 will ignore for localization operations, such as towards the dynamic or unreliable region (e.g., generally towards location 154). The direction 162 can point away from the direction that that the robot will scan when performing single-laser-scanner localization operations. Alternatively, the direction 162 could point in the direction where the robot will scan the environment to perform localization, so that the direction 162 would point away from the dynamic or unreliable area that the user desires to avoid scanning when performing localization, and the selection of the first or second laser scanners 112*a*, 112*b* can be switched from the example described in connection with FIGS. 5 and 6.

In some embodiments, a user can designate the area 160, such as the shape, location, and/or size of the area 60, as well as the direction 162 for the area. A user interface 124 on the robot 100 could be used to designate the area 160 and/or direction 162. A user interface 124 on a separate system (e.g., a computer, smartphone, or tablet) could be used to designate the area 160 and/or the direction 162. The area 160 and/or direction 162 can be communicated to the robot 100 via the communication interface 122. The area 160 and/or direction 162 information can be stored in the member 120 of the robot 100, such as along with the map information that is used for localization.

Figure 7:
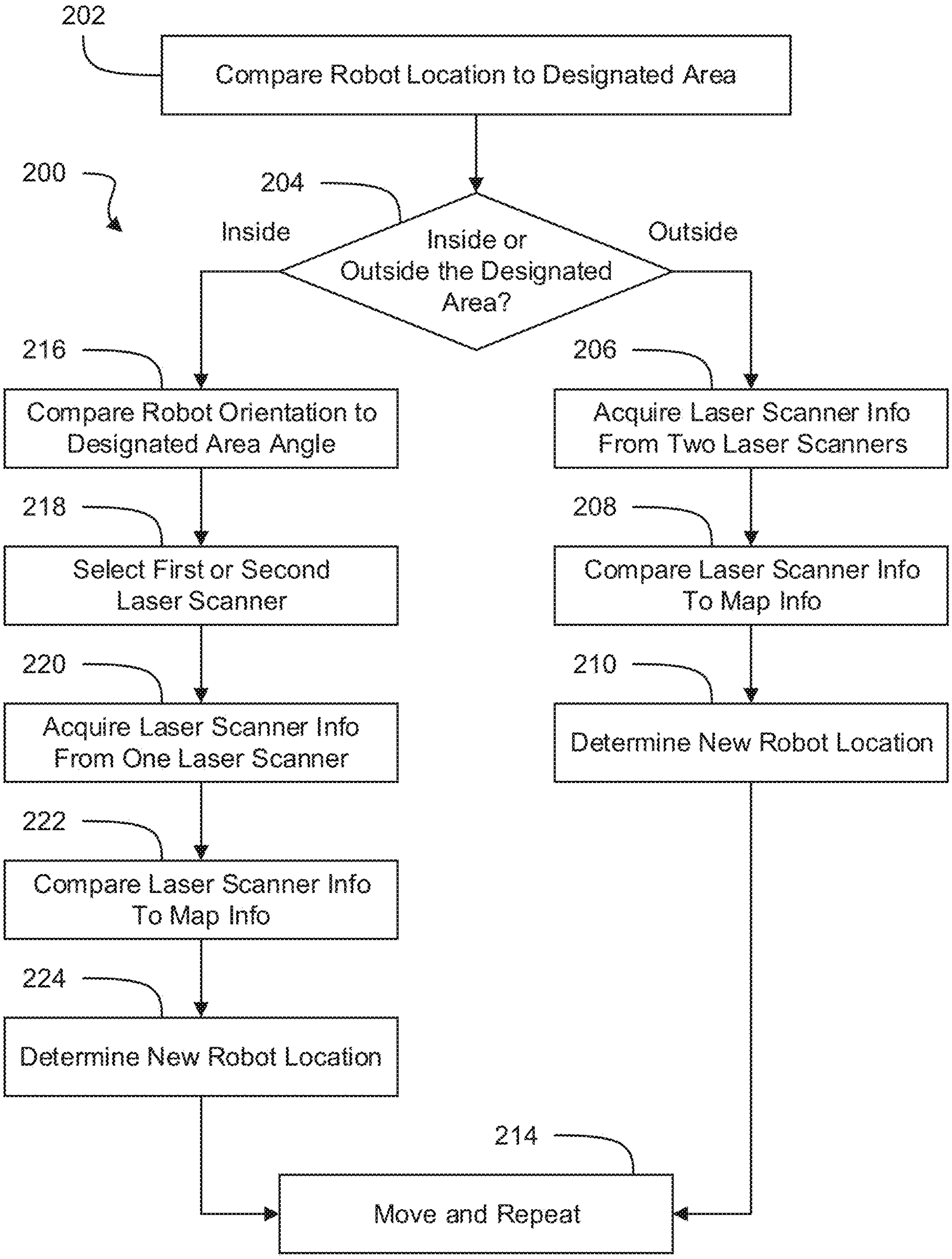
FIG. 7 is a flowchart of an example method for performing a localization procedure for a mobile robot.

FIG. 7 is a flowchart of an example method 200 for performing localization for a mobile robot, such as when operating in a mapped environment. The method can be performed by the robot 100, so that the robot can determine its own location. In some cases, at least part of the localization analysis could be performed by a separate system. For example, the robot 100 could send the laser scan information to the separate system for localization analysis, and the separate system could communicate back the determined location of the robot.

At block 202, the robot location can be compared to a designated area 160 to determine whether the robot location is inside the designated area. The location of the robot from a prior localization operation can be used. At block 204, if the robot location is outside of the area, the method can proceed to block 206 to perform double-laser-scanner localization. At block 206, the information from both of the laser scanners can be obtained and used for localization. In some cases, the laser scan information from both laser scanners can be combined. At block 208 the laser scanner information (e.g., from both laser scanners 112*a* and 112*b*) can be compared to map information, such as to find a location for which the laser scanner information sufficiently matches the map information, and at block 210 that location can be determined to be the new robot location. The robot location can be updated, such as in the memory of the robot 100 itself, with other systems, etc. At block 214, the process can then repeat, such as by returning to block 202. In some cases, the robot can move between localization procedures, so that the robot is at a different location for the next localization.

At block 204, if the robot location is inside of the area, the method can proceed to block 216 to perform single-laser-scanner localization. At block 216, the orientation of the robot can be compared to a direction associated with the area, such as to determine an angle between the direction that the robot is facing and the direction of the area. At block 218, the first laser scanner 112*a* or the second laser scanner 112*b* can be selected for use during the localization based on the comparison of the robot orientation to the direction or angle associated with the area. For example, if the angle between the direction of the robot and the direction of the area is in a first range, then only the first laser scanner 112*a* is used for localization. If the angle between the direction of the robot and the direction of the area is in a second range, then only the second laser scanner 112*b* is used for localization.

At block 220 information from the one laser scanner can be obtained and used for localization (e.g., and the other laser scanner does not operate or is ignored by the localization procedure). At block 222 the laser scanner information (e.g., from one of the laser scanners 112*a* or 112*b*) can be compared to map information, such as to find a location for which the laser scanner information sufficiently matches the map information, and at block 224 that location can be determined to be the new robot location. The robot location can be updated, such as in the memory of the robot 100 itself, with other systems, etc. At block 214, the process can then repeat, such as by returning to block 202. In some cases, the robot can move between localization procedures, so that the robot is at a different location for the next localization.

Many alternatives are possible. In some embodiments, the robot 100 can have more than two laser scanners, such as 3, 4, 5, 6, 8 or more laser scanners. A first localization mode can use more of the laser scanners than the second localization mode. In some embodiments, single laser scanner localization can be the default and the user can specify areas for double laser scanner localization. In some embodiments, the user can designate other areas for other types of localization, such as for localization based on GPS or for localization using overhead lights, or any other suitable type of localization. For example, the user can designate an outdoor area to use GPS localization, and the user can designate an illuminated indoor area to use localization based on overhead lights, and the user can designate other indoor areas to use laser scanner localization (e.g., single and/or double laser scanner localization).

Additional Information

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A mobile robot comprising:

a drive system configured to move the mobile robot;

a first laser scanner;

a second laser scanner; and a localization system configured to:

operate in a first mode that uses both the first laser scanner and the second laser scanner to determine a first location of the mobile robot in an environment of the mobile robot based at least in part on determining that the mobile robot is operating outside of a designated area in the environment; and operate in a second mode that uses the first laser scanner and does not use the second laser scanner to determine a second location of the mobile robot in the environment based at least in part on determining that the mobile robot is operating within the designated area.

2. The mobile robot of claim 1, wherein the localization system is further configured to:

compare an orientation of the mobile robot to a direction associated with the designated area; and select the first laser scanner to use in the second mode based at least in part on the comparison of the orientation of the mobile robot to the direction associated with the designated area.

3. The mobile robot of claim 1, wherein the localization system is further configured to:

determine an angle between an orientation of the mobile robot and a direction associated with the designated area; and select the first laser scanner to use in the second mode based at least in part on determining the angle corresponds to a first angle range.

4. The mobile robot of claim 1, wherein the localization system is configured to select the first laser scanner to use in the second mode based at least in part on an orientation of the mobile robot.

5. The mobile robot of claim 1, wherein to operate in the first mode, the localization system is configured to:

perform a first laser scan using the first laser scanner to obtain first laser scan information;

perform a second laser scan using the second laser scanner to obtain second laser scan information; and compare the first laser scan information and the second laser scan information to a map of the environment to determine the first location of the mobile robot.

6. The mobile robot of claim 1, wherein the first laser scanner and the second laser scanner together provide a laser scanning range that extends at least about 360 degrees around the mobile robot.

7. The mobile robot of claim 1, wherein the first laser scanner has a laser scanning range of at least about 180 degrees, and wherein the second laser scanner has a laser scanning range of at least about 180 degrees.

8. The mobile robot of claim 1, wherein a laser scanning range of the first laser scanner overlaps at least partially a laser scanning range of the second laser scanner.

9. The mobile robot of claim 1, wherein to operate in the second mode, the localization system is configured to:

perform a laser scan using the first laser scanner to provide laser scan information; and compare the laser scan information to a map of the environment to determine the second location of the mobile robot.

10. The mobile robot of claim 9, wherein the localization system is configured to select the first laser scanner to use in the second mode based at least in part on a comparison of an orientation of the mobile robot to a direction associated with the designated area.

11. The mobile robot of claim 1, wherein the localization system is configured to:

perform a first attempt to determine the first location of the mobile robot according to the first mode; and in response to a determination that the localization system is unable to determine the first location of the mobile robot according to the first mode, perform a second attempt to determine the first location of the mobile robot according to the second mode.

12. A mobile robot comprising:

a drive system configured to move the mobile robot;

a first laser scanner;

a second laser scanner; and a localization system configured to operate in a first mode and a second mode, the first mode using both the first laser scanner and the second laser scanner to determine an updated location of the mobile robot and the second mode using the first laser scanner and not using the second laser scanner to determine the updated location of the mobile robot, wherein the localization system comprises:

a hardware processor; and computer readable memory that includes a map of an environment, a designated area in the environment, a prior location of the mobile robot, and a direction associated with the designated area, the computer readable memory having instructions that are executable by the hardware processor to:

compare the prior location of the mobile robot to the designated area to determine whether the prior location of the mobile robot is inside or outside of the designated area;

based at least in part on determining that the prior location of the mobile robot is outside of the designated area:

perform a first laser scan using the first laser scanner to obtain first laser scan information;

perform a second laser scan using the second laser scanner to obtain second laser scan information; and compare the first laser scan information and the second laser scan information to the map of the environment to determine the updated location of the mobile robot; and based at least in part on determining that the prior location of the mobile robot is inside the designated area:

compare an orientation of the mobile robot to the direction associated with the designated area to determine an angle between the orientation of the mobile robot and the direction associated with the designated area;

identify the first laser scanner based at least in part on the determined angle;

perform a laser scan using the first laser scanner to obtain laser scan information; and compare the laser scan information to the map of the environment to determine the updated location of the mobile robot.

13. The mobile robot of claim 12, wherein the first laser scanner and the second laser scanner together provide a laser scanning range that extends at least about 360 degrees around the mobile robot.

14. The mobile robot of claim 12, wherein the first laser scanner has a laser scanning range of at least about 180 degrees, and wherein the second laser scanner has a laser scanning range of at least about 180 degrees.

15. The mobile robot of claim 12, wherein a laser scanning range of the first laser scanner overlaps at least partially a laser scanning range of the second laser scanner.

16. A mobile robot comprising:

a drive system configured to move the mobile robot;

a first laser scanner;

a second laser scanner; and a localization system configured to operate in a first mode and a second mode, the first mode using both the first laser scanner and the second laser scanner to determine an updated location of the mobile robot and the second mode using the first laser scanner and not using the second laser scanner to determine the updated location of the mobile robot, wherein the localization system comprises:

a hardware processor; and computer readable memory that includes a map of an environment, a designated area in the environment, and a location of the mobile robot, the computer readable memory having instructions that are executable by the hardware processor to:

compare the location of the mobile robot to the designated area to determine whether the location of the mobile robot is inside or outside of the designated area;

based at least in part on determining that the location of the mobile robot is outside of the designated area:

perform a first laser scan using the first laser scanner to obtain first laser scan information;

perform a second laser scan using the second laser scanner to obtain second laser scan information; and compare the first laser scan information and the second laser scan information to the map of the environment to determine the updated location of the mobile robot; and based at least in part on determining that the location of the mobile robot is inside the designated area:

perform a laser scan using the first laser scanner and not using the second laser scanner to obtain laser scan information; and compare the laser scan information to the map of the environment to determine the updated location of the mobile robot.

17. The mobile robot of claim 16, wherein the computer readable memory includes a direction associated with the designated area and information indicating an orientation of the mobile robot, and wherein the instructions are executable by the hardware processor to:

compare the orientation of the mobile robot to the direction associated with the designated area; and identify the first laser scanner based at least in part on the comparison of the orientation of the mobile robot to the direction associated with the designated area.

18. The mobile robot of claim 17, wherein the instructions are executable by the hardware processor to:

compare the orientation of the mobile robot to the direction associated with the designated area to determine an angle between the orientation of the mobile robot and the direction associated with the designated area; and identify the first laser scanner based at least in part on the determined angle between the orientation of the mobile robot and the direction associated with the designated area.

19. The mobile robot of claim 16, wherein the first laser scanner and the second laser scanner together provide a laser scanning range that extends at least about 360 degrees around the mobile robot.

20. The mobile robot of claim 16, wherein the first laser scanner has a laser scanning range of at least about 180 degrees, and wherein the second laser scanner has a laser scanning range of at least about 180 degrees.

* * * * *